US011787573B2

(12) United States Patent
Andeweg

(10) Patent No.: US 11,787,573 B2
(45) Date of Patent: Oct. 17, 2023

(54) METHOD FOR INSPECTING AND/OR MANIPULATING A BEAM USING AN UNMANNED AERIAL VEHICLE AND UNMANNED AERIAL VEHICLE SUITABLE THEREFOR

(71) Applicant: Terra Inspectioneering B.V., Vlissingen (NL)

(72) Inventor: Sem Andeweg, Oostburg (NL)

(73) Assignee: Terra Inspectioneering B.V., Vlissingen (NL)

( * ) Notice: Subject to any disclaimer, the term of this patent is extended or adjusted under 35 U.S.C. 154(b) by 554 days.

(21) Appl. No.: 17/043,009

(22) PCT Filed: Mar. 29, 2019

(86) PCT No.: PCT/NL2019/050197
§ 371 (c)(1),
(2) Date: Sep. 30, 2020

(87) PCT Pub. No.: WO2019/190325
PCT Pub. Date: Oct. 3, 2019

(65) Prior Publication Data
US 2021/0024212 A1   Jan. 28, 2021

(30) Foreign Application Priority Data
Mar. 30, 2018   (NL) .................................. 2020695

(51) Int. Cl.
*B64U 10/14*   (2023.01)
*B64U 60/00*   (2023.01)
(Continued)

(52) U.S. Cl.
CPC ............. *B64U 10/14* (2023.01); *B64U 60/00* (2023.01); *B64U 70/00* (2023.01);
(Continued)

(58) Field of Classification Search
CPC .... B64U 10/14; B64U 60/00; B64U 2101/00; B64U 2101/26; B64U 2101/29
See application file for complete search history.

(56) References Cited

U.S. PATENT DOCUMENTS

| 5,445,094 A | 8/1995 | Kai et al. |
| 2016/0339277 A1 | 11/2016 | Angelopoulos |
| 2018/0035606 A1* | 2/2018 | Burdoucci ............. A01D 34/84 |

FOREIGN PATENT DOCUMENTS

| CN | 105775115 | 7/2016 |
| CN | 106125756 | 11/2016 |

(Continued)

*Primary Examiner* — Jessica B Wong
(74) *Attorney, Agent, or Firm* — N.V. Nederlandsch Octrooibureau

(57) ABSTRACT

Method for inspecting and/or manipulating a beam at a lower side of a roof or deck, the beam including a strip, the method comprising the steps of:
providing an unmanned aerial vehicle, UAV, wherein the UAV comprises a body, a number of rotors, a first arm; and an inspection and/or manipulation tool;
while the first arm is in the first position, flying the UAV towards the beam;
when the UAV contacts the beam, moving the first arm from the first position to the second position such that the end of the first arm is moved to a position vertically above the strip;
reduce the propulsion force until the UAV hangs from the beam with the end of the arm in contact with and supported by the strip; and
inspecting and/or manipulating the beam, using the inspection and/or manipulation tool, while the UAV hangs from the beam.

20 Claims, 7 Drawing Sheets

(51) Int. Cl.
    *B64U 101/26*    (2023.01)
    *B64U 101/29*    (2023.01)
    *B64U 70/00*     (2023.01)
    *B64U 101/00*    (2023.01)

(52) U.S. Cl.
    CPC ...... *B64U 2101/00* (2023.01); *B64U 2101/26* (2023.01); *B64U 2101/29* (2023.01)

(56) References Cited

FOREIGN PATENT DOCUMENTS

| | | |
|---|---|---|
| CN | 106542092 | 3/2017 |
| CN | 107416194 | 12/2017 |
| DE | 102016214655 | 2/2018 |
| EP | 3211226 | 1/2017 |
| FR | 3035275 | 10/2016 |
| JP | 2017124689 | 7/2017 |
| KR | 20170130140 | 11/2017 |
| WO | 2017176324 | 10/2017 |
| WO | 2018056501 | 3/2018 |

\* cited by examiner

METHOD FOR INSPECTING AND/OR MANIPULATING A BEAM USING AN UNMANNED AERIAL VEHICLE AND UNMANNED AERIAL VEHICLE SUITABLE THEREFOR

TECHNICAL FIELD

The invention relates to a method for inspecting and/or manipulating a beam at a lower side of a roof or deck, and to an unmanned aerial vehicle, UAV, for inspecting and/or manipulating a beam at a lower side of a roof or deck. The method and UAV are particularly suited for use in environments, such as storage tanks, e.g. for oil, chemicals or food stuffs, on land or in a floating vessel, in which the lower side of the roof or deck is difficult to access by a person from a location below the roof of deck. The method and UAV are also suitable for use in substantially closed environments in which there may be poisonous fumes and/or a risk of explosion.

BACKGROUND ART

Roofs of warehouses, ship rooms or hydrocarbon tanks, or bridge decks are often supported by beams or girders, usually made of steel, which are arranged at their lower side.

Such beams or girders provide structural integrity, and in conformity with safety regulations the beams are to be regularly inspected for presence of cracks, corrosion, deformation, and the like. In order to reach the beams, it is known to build a stage or scaffold inside of a warehouse, room or storage tank in order to reach the beams at the lower side of a roof thereof, and inspect them or perform the necessary manipulations for maintenance.

US 2016/0339277 describes a method for inspecting an inside room of a ship and/or performing works therein. The method comprises the following steps: a) inserting, through an opening, which is preferably provided in a ceiling portion of the inside room, accommodating means for accommodating at least one person; b) attaching at least one rope at an upper part of the inside room, wherein the at least one rope is attached at the upper part of the inside room: i. manually by one or a plurality of climbing persons using climbing equipment, and/or ii. by means of a drone, and/or iii. by means of a pivotable rod; and c) moving the accommodating means up and down along the at least one rope for inspecting the inside room and/or performing works therein by at least one service person accommodated by the accommodating means. Though the known method allows a person to inspect or manipulate a beam at close range, the method is time consuming to carry out.

It would be desirable to provide a method and/or a device which allows for safe and fast inspection and/or manipulation of the beam.

SUMMARY OF THE INVENTION

To this end, according to a first aspect the invention provides a method for inspecting and/or manipulating a beam at a lower side of a roof or deck, wherein the beam comprises a strip which has a first surface facing said lower side and spaced apart therefrom, and a second surface facing away from the first surface, the method comprising the steps of:—providing an unmanned aerial vehicle, UAV, wherein the UAV comprises: a body, comprising an abutment element having a top surface adapted for abutting the second surface of the strip; a number of rotors for exerting a propulsion force on the UAV in an upward direction, wherein the rotors are supported by the body and arranged below the top surface; a first arm, pivotably connected to the body, the first arm having an end portion for contacting the first surface, wherein the first arm is movable relative to the body between a first position in which, when seen in projection onto a plane parallel to the top surface, the end portion is spaced apart from the top surface, and a second position in which the end portion of the arm is arranged above the top surface; and an inspection and/or manipulation tool; the method further comprising:—while the first arm is in the first position, controlling the rotors to exert a propulsion force on the UAV for flying the UAV towards the beam such that the top surface approaches the second surface of the strip;—when the top surface of the abutment element contacts the second surface of the strip, moving the first arm from the first position to the second position such that the end portion of the first arm is moved to a position vertically above the first surface of the strip, and preferably such that the first surface is arranged between the body and the end portion of the first arm;—controlling the rotors to reduce the upwardly directed propulsion force until the UAV hangs from the beam with the end portion of the arm in contact with and supported by the first surface of the strip; and—inspecting and/or manipulating the beam, using the inspection and/or manipulation tool, while the UAV hangs from the beam.

The beam can thus conveniently be inspected and/or manipulated, without requiring a person to spent time to closely approach the beam. The UAV can hover towards the beam and hang from the beam, after which the UAV can inspect and/or manipulate a portion of the beam. There is no need for building stages or climbing up to the beam, since the inspection and/or manipulation tool is included in the UAV. A particular advantage of the invention is that the UAV's power consumption can be reduced by switching off the propellers when the UAV hangs from the beam. The amount of time that the UAV can be used for inspection/manipulation of the beam without having to recharge the UAV is thus improved. The hanging arrangement of the UAV further provides increased stability for carrying out measurements and/or manipulation on the beam, and also improves safety as compared to a hovering drone.

When seen from the top side, when the arm is in the first position, then end portion of the arm is spaced apart from the top surface. Instead, the end portion is arranged spaced apart from the top surface when seen in projection onto a plane parallel to and through the top side. In the second position, the arm's end portion is located vertically above the top surface, such that an imaginary vertical line intersects both the end portion and the top surface, wherein the imaginary vertical line may also intersect the strip between then end portion and top surface.

The inspection and/or manipulation tool of the UAV is preferably adapted for measuring a property, such as thickness, of a portion of the beam and/or the strip, said method comprising measuring said property. Alternatively or in addition, the inspection and/or manipulation tool may comprise means for manipulating the beam, such as a steel brush, painting equipment or even sampling equipment for taking a (paint) sample of the beam. Though the inspection and/or manipulation tool is typically arranged on the first and/or second arm, it may instead be located on the body of the UAV or on a separate arm of the UAV so that the tool can be moved towards and away from a beam when the UAV hangs from the beam.

In an embodiment, when the UAV hangs from the beam, the top surface is spaced apart from the second surface. Instead of being clamped to the beam, the UAV thus hangs freely from the beam. In this way, the method can be applied to beams with strips with non-uniform thickness. Moreover, in this embodiment, movement of the UAV along the beam when the UAV hangs from the beam is not hindered by the strip being clamped between the arm(s) and the top surface.

In a preferred embodiment, the UAV further comprises a second arm, pivotably connected to the body, the second arm having an end portion for contacting the first surface, wherein the second arm is movable relative to the body between a first position in which, when seen in projection onto a plane parallel to the top surface, the end portion is spaced apart from the top surface, and a second position in which the end portion of the second arm is arranged above the top surface; wherein the method further comprises, when the top surface of the abutment element contacts the second surface of the strip: moving the second arm from the first position to the second position such that the end portion of the second arm is moved to a position vertically above the first surface of the strip, and preferably such that the first surface is arranged between the body and the end portion of the second arm, and wherein, when the rotors are controlled to reduce the upwardly directed propulsion force until the UAV is in a hanging position, the UAV is supported on the beam by the end portions of the first and second arms which contact the first surface of the strip. With such a second arm, the UAV can hang from the beam while being supported by multiple spaced-apart contact points, which improves stability and security. In addition, the risk of the UAV falling off the beam is reduced when the UAV is supported on two arms on contacting the first surface on opposite sides of said first surface.

In an embodiment the method further comprises, when the UAV hangs from the beam, moving the UAV along the beam using a propulsion mechanism of the UAV while the propulsion mechanism is in contact with the beam, preferably while the rotors are switched off. Performing the inspection/manipulations is often required at multiple positions along the length of the beam. The propulsion mechanism allows the UAV to move along the beam. In the hanging position the UAV may be supported by the propulsion mechanism.

In an embodiment the propulsion mechanism comprises one or more rotatable wheels, arranged at the end portions of the first arm and/or second arm, and/or arranged at the top surface of the abutment element. The wheels allow the UAV to be moved along the beam when hanging from the beam and while the rotors are switched off. The end portions of the first and/or second arm may be formed by one or more of the wheels. Alternatively, the propulsion mechanism may comprise a continuous track arranged around one or more of the wheels and adapted for contacting the beam. Preferably, at least one of the wheels is driven, for instance by an electromotor of the UAV.

In an embodiment, the first and second arm are each provided with one or more wheels at their respective end portions, wherein the first and second arm are configured such that one or more axes of rotation of the wheels of the first arm substantially intersect one or more wheels of the second arm when the arms are in the second position, and/or one or more axes of rotation of the wheels of the second arm substantially intersect one or more wheels of the first arm when the arms are in the second position. Each wheel can rotate relative to the end portion of its respective arm around its axis of rotation. Preferably, when the first and second arm are in the second position, the axes of rotation of the wheels of the first and second arms are substantially parallel to each other or substantially coaxial with each other.

In an embodiment the UAV comprises a manipulation tool in the form of cleaning equipment for cleaning a portion of the beam, and comprises an inspection tool for inspection a portion of the beam, the method comprising, when the UAV is in a hanging position in which the UAV is supported on the beam: operating the cleaning equipment to clean a portion of the beam; positioning the inspection tool at the cleaned location of the beam and inspecting said cleaned location using the inspection tool. Thus, the beam property may be measured, e.g. when the inspection tool is a thickness sensor such as an ultrasonic gauge sensor, at a cleaned surface of the beam, resulting in accurate measurement of the property. Preferably, when the measurement is carried out, the inspection tool is positioned to make contact with the cleaned portion of the beam.

According to a second aspect, the invention provides a unmanned aerial vehicle, UAV, for inspecting and/or manipulating a beam at a lower side of a roof or deck, wherein the beam comprises a strip which has a first surface facing said lower side and spaced apart therefrom, and a second surface facing away from the first surface, the UAV comprising: a body comprising an abutment element which has a top surface adapted for abutting the second surface of the strip; a number of rotors supported by the body, the rotors being arranged below the top surface and adapted for exerting a propulsion force on the UAV in an upward direction; a first arm, pivotably connected to the body, the first arm having an end portion for contacting the first surface, the first arm being movable relative to the body between a first position in which, when seen in projection onto a plane parallel to the top surface, the end portion is spaced apart from the top surface, and a second position in which the end portion of the first arm is arranged above the top surface; a second arm, pivotably connected to the body, the second arm having an end portion for contacting the first surface, the second arm being movable relative to the body between a first position in which, when seen in projection onto the plane parallel to the top surface, the end portion is spaced apart from the top surface, and a second position in which the end portion of the second arm is arranged above the top surface; an inspection and/or manipulation tool for inspecting and/or manipulating the beam or a portion thereof; wherein the end portions of the first and second arm each comprise a contact surface adapted for contacting the first surface, each contact surface, when its corresponding arm is in the second position, facing towards the body of the UAV. The UAV may be used to carry out the method of the invention as described above, and benefits from the same advantages.

The contact surfaces of the end portions of the arms, when the arms are in the second position and when the top surface abuts the second surface of the strip, are arranged for contacting the first surface of the strip as soon as the body of the UAV moved vertically away from the second surface. The contact surfaces are adapted for vertically axially supporting the UAV on the first surface when in contact with the first surface. Preferably, the arms are pivotably connected to the body at hinge points which are positioned between the plane that is defined by the rotors and a plane parallel thereto and through the top surface.

In an embodiment, the contact surfaces are configured to be arranged spaced apart from each other on either side of the upright portion of the beam when the arms are in the second position. Thus, when the UAV is suspended from the beam while in use, the contact surface of the first arm contacts a portion of the first surface of the strip which is arranged on one side of the upright portion of the beam, and the contact surface of the second arm contacts another portion of the first surface on an opposite side of the upright portion, with the upright portion being arranged between the two contact surfaces.

In an embodiment, the first and second arm are arranged such that, when they are moved from the first position to the second position, a lateral distance between the contact surfaces of the first and second are decreases continuously during said movement. When both arms are in the second position the lateral distance is preferably at least 5 cm, more preferably at least 10 cm, even more preferably at least equal to 1.5 times a thickness of the upright portion of the beam and less than the width of the first surface of the strip. In an embodiment the arms, when in their first positions, are completely arranged below a plane through the top surface, the plane being parallel to a plane in which the rotors extend. In this manner the arms may remain out of the way when the UAV approaches the beam, i.e. the arms may remain spaced apart from the beam during the approach, allowing the UAV to approach the beam from many directions, e.g. not just vertically towards the second surface, but also at an angle or even sideways.

In an embodiment the arms, when in their first positions, are arranged completely between a plane in which the rotors extend and a plane parallel thereto through the top surface. In this way, the arms cannot collide with the rotors, and the risk of the arms touching the ground when the landing the UAV on the ground is reduced.

In an embodiment when the arms are in their first positions, all parts of the UAV are completely arranged at a side of the top surface which faces towards the body. In this manner the risk of damage to parts of the UAV when approaching the beam is substantially reduced as the top surface will be the first part of the UAV that comes into contact with the beam.

In an embodiment the UAV is adapted for approaching the beam with the arms in the first position, and for hanging from the beam in a hanging position with the arms in the second position, in which the UAV is supported by the end portions of the arms, with said end portions contacting the first surface of the strip. When the UAV hangs from the strip, power consumption of the rotors may be reduced, as described above.

In an embodiment the inspection and/or manipulation tool comprises one or more sensors adapted for measuring a thickness of the beam, preferably wherein said one or more sensors are arranged on the first arm and/or second arm. The one or more sensors are preferably arranged on the UAV in such a manner that they can determine a thickness of a portion of the beam that extends substantially normal to the first surface of the strip. This allows the UAV to be used to measure thickness of a portion of the beam, e.g. of a vertically extending upright portion of the beam, or of the strip which has the first and second surface. Examples of suitable sensors are an ultrasonic thickness gauge which can measure a thickness of a portion of a beam when contacting the beam, distance sensors arranged e.g. on the end portions of the first and second arm so they can measure distances to the beam when the arms are in the second position, and the like.

In an embodiment the inspection and/or manipulation tool comprises cleaning equipment for cleaning a portion of the beam, such as a steel brush. For instance, the UAV may comprise a manipulation tool provided with cleaning equipment for cleaning a portion of the beam, as well as an inspection tool, e.g. a thickness sensor, for measuring a property of the cleaned portion of the beam. Preferably such a cleaning equipment and inspection tool are arranged on the UAV at a location such that when the UAV is propelled along a longitudinal direction of the beam, first the manipulation tool may contact a portion of the beam to clean it, and subsequently the inspection tool may contact the cleaned portion of the beam to measure a property of the beam. In this manner, beam property can be measured at a clean portion of the beam, which typically improves the accuracy of the measurement.

In an embodiment the UAV further comprises a propulsion mechanism, adapted for moving the UAV along the beam while making contact with the beam.

In an embodiment the UAV further comprises a propulsion mechanism, adapted for moving the UAV along the beam while making contact with the beam.

Using the propulsion mechanism a profile of measured properties along the beam can be acquired, wherein the length of the profile may have an uninterrupted length of 2 meters or more.

In an embodiment, the propulsion mechanism comprises rotatable wheels, wherein each wheel is comprised in one of the first arm, the second arm, and the abutment element.

In an embodiment the UAV further comprises a motor, e.g. an electromotor, for driving rotation of one or more of said wheels.

In an embodiment the first arm and/or the second arm is further provided with an alignment device adapted for contacting a portion of the beam between the strip and the lower side of the deck or roof when the arms are in the second positions. The alignment device facilitates positioning of the end portions of the first and/or second arm of the UAV stays at a predefined distance from a portion of the beam, which is typically a portion of the beam which extends substantially vertically from the strip towards the lower side of the deck or roof.

In an embodiment both the first arm and second arm are provided with an alignment device for contacting oppositely facing surfaces of a portion of the beam between the strip and the lower side of the deck or roof when the arms are in the second positions. The alignment devices may thus contact oppositely facing surfaces of the upright portion of the beam, such that positioning of the end portions of both the first and second arms at predetermined distances from the respective oppositely facing surfaces is facilitated. When the alignment devices contact said surfaces from opposite directions, they also substantially prevent movement of the UAV in a direction transverse to the longitudinal direction in which the beam extends, in this manner preventing the UAV from rolling off the strip and falling from the beam.

Each alignment device may comprise a wheel that is rotatably attached to its arm, and which is able to roll along a part of the beam so as to keep the UAV aligned to the beam and reduce the risk of falling off. The alignment device may be fixedly attached to the arm, or may be pivotably connected to the arm.

In an embodiment, the first arm and the second arm are arranged opposite from each other, and wherein when the arms are moved from the first to the second positions, the end portions of the arms approach each other. The arms are mounted at opposite sides of the longitudinal direction of the UAV, i.e. adapted to be arranged at either side of the beam when in use. The end portions may thus be moved from their first positions to the second positions to approach an upright portion of the beam between the second surface and the lower side of the roof or deck, from both sides of the upright portion.

In an embodiment the location of pivotable connection between the body and the first arm and/or second arm is mechanically adjustable, preferably in such a manner that a distance between the pivotable connections of the first and second arms is adjustable. The locations of the pivotable connection(s) can be shifted relative to the body at least in a direction substantially parallel to the top surface. This may for instance be achieved by means of a slide bar on which the pivotable connections of arms are slidably mounted and wherein the position of the pivotable connection can be releasably locked, or by simply providing different locations where the arms can be pivotably connected on the body. In this way, also the spacing of the contact surfaces of the end portion of the first and/or second arm relative to the body and, optionally, relative to the other arm, is adjustable when in the second position. The same UAV may thus be used to grasp beams having different widths.

In an embodiment, the first arm and/or the second arm has a nonlinear shape, preferably a sickle-shape, a hook-shape or an L-shape. These shapes allow the arms to reach around the edges of the strip of the beam in the second position, to provide for stable grip around the beam.

In an embodiment the UAV further comprises a third arm and a fourth arm. The third arm preferably has a same functionality as the first arm, and the fourth arm preferably has a same functionality as the second arm. The third and fourth arm can thus also move relative to the body from a first position to a second position to provide extra support for the UAV when it hangs from a beam. The third and fourth arm also provide redundancy in the event of the first and/or second arm malfunctioning.

In an embodiment, the inspection and/or manipulation tool is arranged on an end portion of one of the arms, preferably spaced apart from the contact surface of said end portion. The inspection and/or manipulation tool is typically adapted for making pressure contact with the beam, in particular with a portion of the beam other than the strip.

BRIEF DESCRIPTION OF DRAWINGS

Embodiments will now be described, by way of example only, with reference to the accompanying schematic drawings in which corresponding reference symbols indicate corresponding parts.

DESCRIPTION OF EMBODIMENTS

Figure 1A:
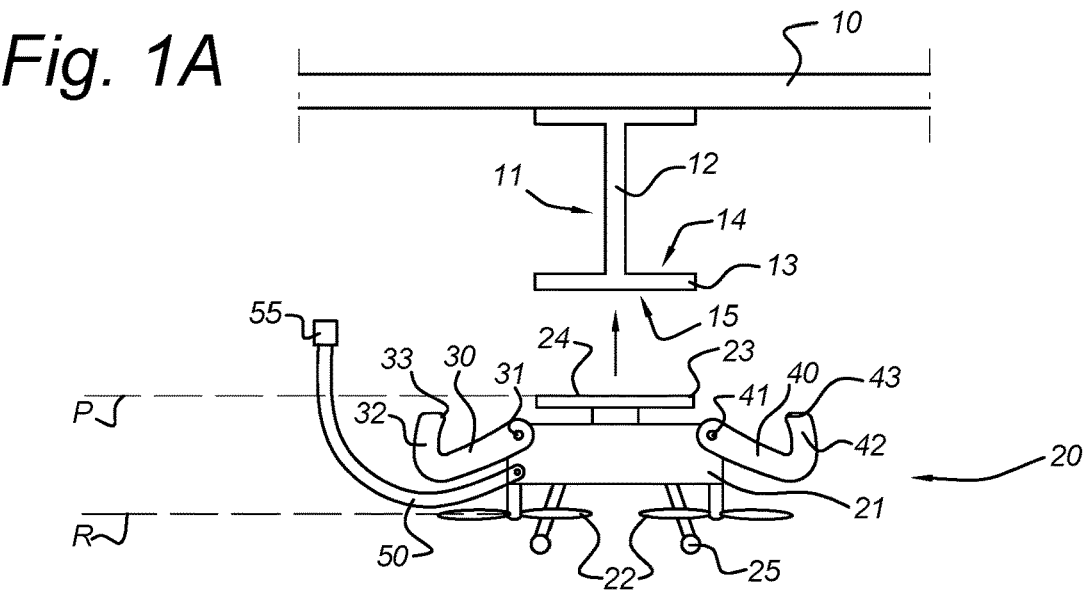
FIGS. 1A-1D schematically show a method for inspecting and/or manipulating a beam, using a UAV according to a first embodiment of the invention.
Figure 1B:
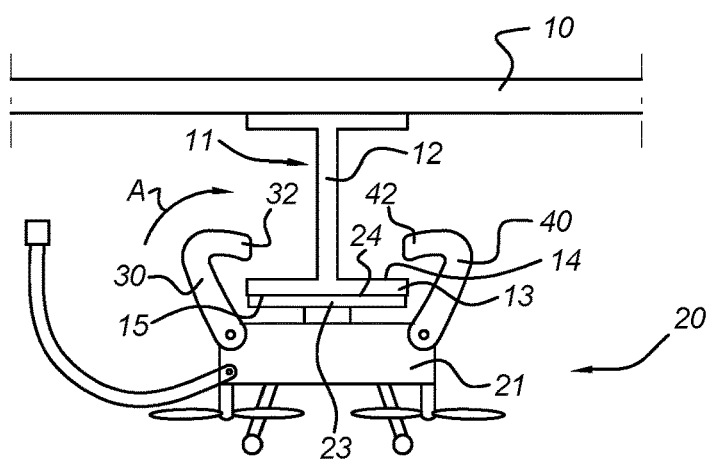
Figure 1C:
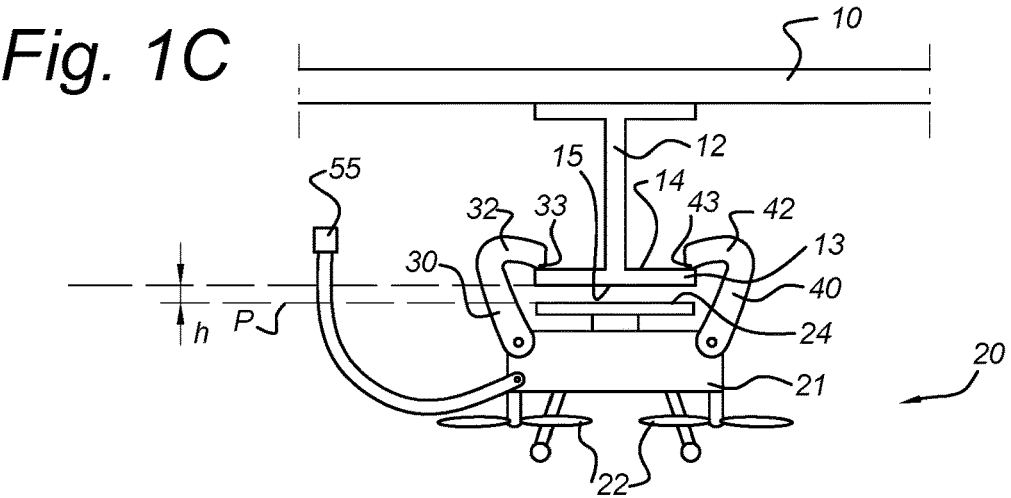

FIGS. 1A-1C illustrate steps for positioning a UAV 20 against a beam 11 at a lower side of a roof or deck 10. Typically, the beam will support a portion of a lower side of a deck, e.g. such as a lower side of a deck of a ship or bridge, or a portion of a lower side roof of a tank, e.g. an oil tank or a tank for storage of explosive and/or abrasive liquids. The beam 11 comprises an upright portion 12 which extends substantially vertically and is connected to a strip 13 which has a first surface 14 extending substantially normal to the upright portion and which faces the roof 10. The strip 13 further has a second surface 15 which faces away from the first surface 14.

FIG. 1A shows a side view of the UAV 20 as it approaches the beam 11. The UAV 20 comprises a body 21 on which rotors 22 are provided for exerting a substantially vertically directed propulsion force allowing the UAV to be airborne. The body 21 is provided with an abutment element 23 which has a top surface 24 for abutting the beam 11. The UAV 20 further has two arms 30, 40 which are pivotably connected to the body 21 at respective hinge points 31, 41. End portions 32, 42 of the arms include contact surfaces 33, 43 adapted for abutting the first surface 14 so that the drone may be axially supported by the contact surfaces on the beam. The UAV 20 further comprises landing gear 25 and an inspection tool 55, which in the present example is an ultrasonic thickness gauge for measuring a thickness of the upright portion 12 of the beam, but alternatively could be a camera, an infrared camera or heat sensor or other kind of sensor for measuring a property of a portion of the beam. The inspection tool 55 is mounted on an arm 50 separate from arms 30 and 40. It will be appreciated that instead of, or in addition to, the inspection tool 55, a manipulation tool could be provided for manipulating a portion of the beam, e.g. a steel brush for cleaning a portion of the beam, or a sampling probe for obtaining a sample of the beam. In the first position as shown in FIG. 1A, the arms 30, 40 are arranged between a plane R in which the rotors extend, and a plane P parallel to and through the top surface 24.

FIG. 1B shows the UAV 20 positioned with its top surface 24 contacting the second surface 154 of the strip 13. During this contact, the hook-shaped arms 30, 40 are moved upwards and towards the beam, as indicated by the arrows A, until the end portions 32, 42 of the arms, in particular the contact surfaces 33,43 thereof, are positioned above the first surface 14 of the strip 13.

FIG. 1C shows that the top surface 24 of the UAV 20 has moved down and away from the second surface 15 of the strip by a distance h, so that the top surface 24 no longer is in contact with the beam. This downward movement of can easily be achieved by switching off the rotors, or controlling the rotors to move downward with respect to the beam. The contact surfaces 33, 43 at the end portions 32, 42 of the arms 30, 40 now abut the first surface 14 of the strip 13, so that the UAV 20 hangs from the strip 13 and is axially supported by the contact surfaces 33, 43. The contact surfaces 33, 43 define a lateral distance d between them across the beam 11. When the UAV is in such a hanging position, the rotors 22 no longer need to supply an upward propulsion force for keeping the UAV in place with respect to the beam.

Figure 1D:
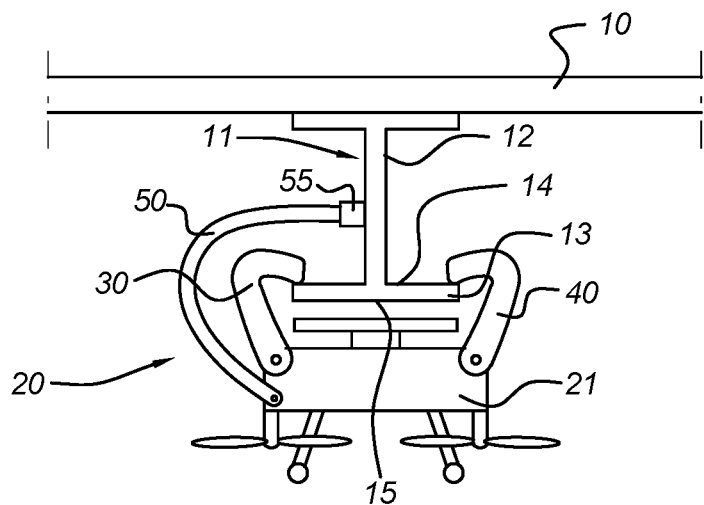

FIG. 1D shows the UAV 20 hanging from the beam 11 by means of the arms 30, 40, wherein the arm 50 supporting the inspection tool 55 has been moved relative to the body towards the upright portion 12 of the beam 11. In this position the inspection tool 55 contacts the beam allowing it to perform a measurement for determining a measure of the thickness of the portion 12 of the beam.

Figure 2:
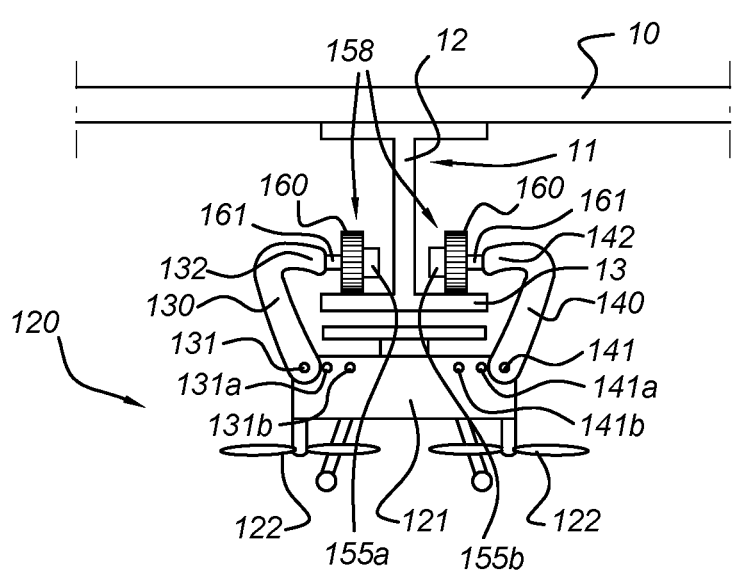
FIG. 2 schematically shows a UAV according to a second embodiment.

FIG. 2 shows a side view of an another embodiment of a UAV 120 according to the invention, hanging from beam 11 at the lower side of a roof or deck 10. The arms 130, 140 of the UAV 120 are at their end portions 132, 142 provided with wheel axles 161 on which wheels 160 are rotatably mounted. The entire weight of the UAV 120 is supported by the wheels 160, and when the wheels are driven to rotate around the axles, the UAV 120 is moved along the beam 11. In the example shown, the wheels 160 comprise in-wheel electrical motors attached to the axles, the wheels and motors therein together forming a propulsion mechanism 158 for driving movement of the UAV along the beam while the rotors are switched off and the wheels are in contact with the beam. Distance sensors 155a, 155b are attached to ends of the axles 161, so that when the arms are in the second position and the axles are parallel to each other a thickness of the upright portion of the beam between the sensors 155a, 155b can be determined, based on the distance to the upright portion measured by the respective distance sensors 155a, 155b. Suitable distance sensors include ultrasound distance sensors and/or laser interferometer sensors.

The arms 130, 140 are detachably and pivotably connected to the body 121 at points 131, 141. The arms can detached from points 131, 141 and reattached any one of point 131a, 131b and 141a, 141b on the body, allowing the points where the arms are pivotable connected to the body to be adjusted. In this manner, distance between the end portions 132, 142 of the arms when the arms are in the second position can be adjusted as well, e.g. in such a manner that this distance is smaller than a width of the strip 13 of the beam 11 but greater than a width of the upright portion 12 of the beam.

Figure 3:
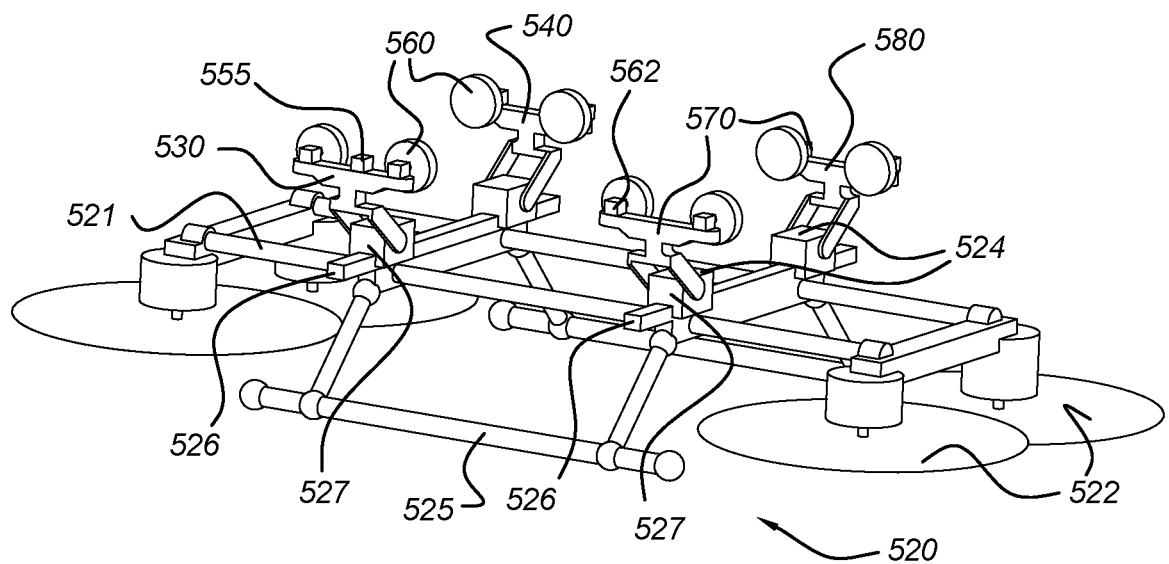
FIGS. 3 and 4 respectively show a schematical isometric view of the UAV according to a third embodiment, and a side view thereof.
Figure 4:
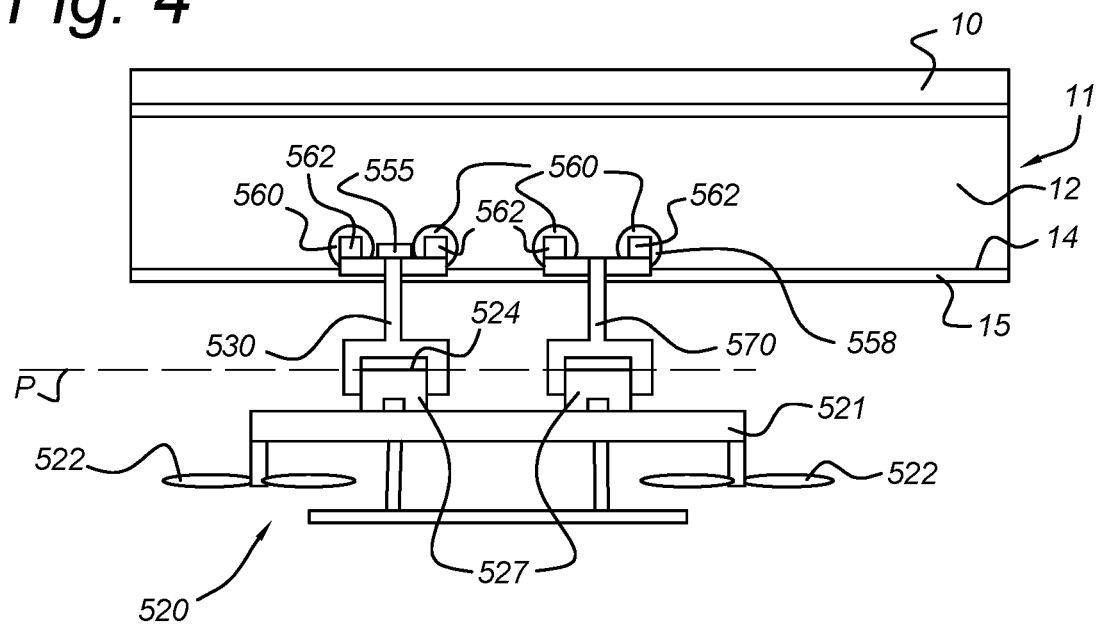

FIGS. 3 and 4 show respectively a perspective view and a schematic side view of a UAV 520 according to a further embodiment of the invention. The UAV 520 comprises a body 521 and a landing gear 525. Four rotors 522 are provided on the body 521, the rotors extending in a substantially common rotor plane. The body 521 is provided with two elongated support bars 526 on each of which two arm supports 527 are detachably mounted. A respective arm 530, 540, 570, 580 is pivotably mounted to each arm support 527. The arm supports serve as abutment elements and each have a top surface 524, wherein the top surfaces of the arm supports extend in a common plane and are adapted for simultaneously abutting a second surface 15 of the strip. In addition, each of the arm supports 527 comprises an actuator for driving rotation of its corresponding arm between first and second positions as described above.

The arms 530, 540, 570, 580 are each provided with two wheels 560 which have parallel axes of rotation and are arranged for contacting a first surface of a beam that faces the roof 10 when the arms are in the second position, as shown. This allows the UAV to roll along a longitudinal direction of the beam 11 while it is axially supported on the first surface 14 of the beam and hanging from the beam. Electromotors 562 are provided for driving rotation of the wheels relative to the corresponding arms, the electromotors 562 together with the wheels 560 forming a propulsion mechanism.

The position of each of the arm supports 527 on the elongated support bars 526 can be adjusted by first unlocking the arm support 527 from the bar 526, then sliding the arm support 527 to a different position on the bar 526 and subsequently locking the position of the arm support 527 on the bar 526. In this manner the distance between the opposing wheels 560 of opposing arms 530 and 540, 570 and 580 when the arms are in the second position with all of the wheels arms 560 rotatable around parallel wheel axes, can be set to a desired distance. The arm supports 527 additionally serve as abutment elements, wherein the top surfaces 524 of each of the abutment elements extend in a common plane. A camera 555 is provided on arms 530, for capturing images of the upright portion 12 of the beam.

Figure 5:
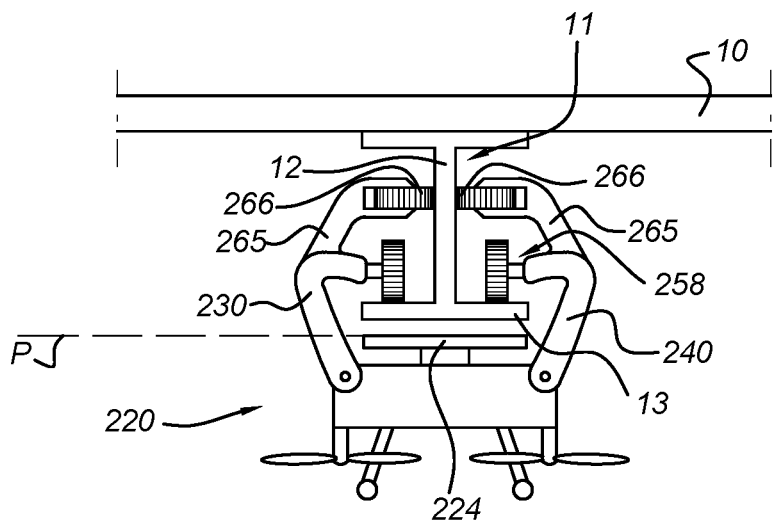
FIG. 5 schematically shows a UAV according to a fourth embodiment.

FIG. 5 shows a side view of another embodiment of UAV according to the invention. The UAV 220 comprises a first and second arms 230, 240 each provided with a propulsion mechanism 258 comprising an electromotor and a wheel 260 attached thereto, driving rolling movement of the UAV along beam 11. The UAV 220 is further provided with an alignment device 265 for contacting an upright portion 12 of the beam 11, to facilitate aligning the UAV 220 to the upright portion as the UAV approaches the beam, and also to keep the UAV substantially aligned with the upright portion of the beam when the UAV is moved along the longitudinal direction of the beam while hanging from the beam. The alignment device 265 comprises wheels 266 having axes of rotation substantially perpendicular to the axes of rotation of wheels 260 and which can roll freely across the upright portion 12 of the beam. The alignment device 265 is attached to the arms 230, 240.

Figure 6:
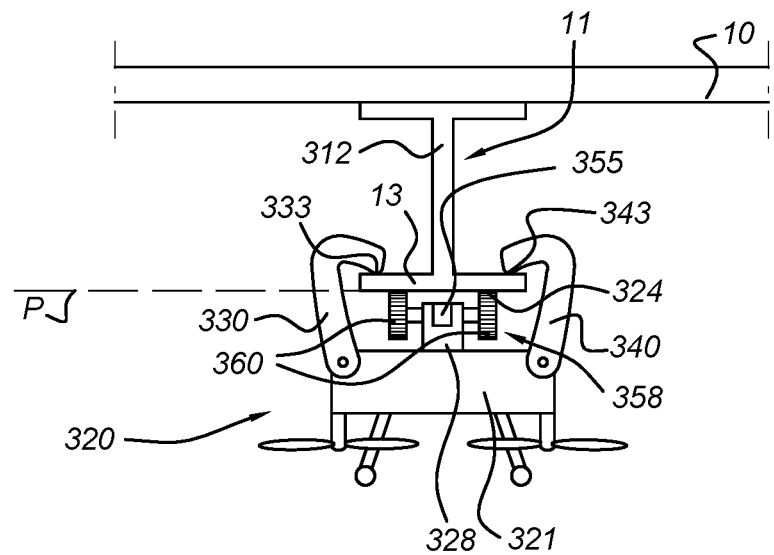
FIG. 6 schematically shows a UAV according to a fifth embodiment.

FIG. 6 shows a side view of an alternative embodiment of a UAV 320. The UAV 320 hangs from the beam 11 on the lower side of a roof or deck 10, using arms 330, 340. Contact surfaces 333, 343 at the end portions of the arms 330, 340 are provided with a low friction coating, such as polytetrafluoroethylene, and thus form slide surfaces which allow the UAV to slide along the beam with reduced friction between the contact surfaces 333, 343 and the beam. The UAV 320 further comprises a propulsion mechanism 358 provided on the body 321 and which includes wheels 360. The wheels 360, which can be driven by an electromotor 328, form abutment elements, wherein the top surfaces 324 of the wheels extend in a common plane P. The wheels 360 are pushed against the lower surface of the strip 13 using a suspension mechanism 328, such that when the wheels are driven, the UAV 320 is moved along the beam 11. The UAV 320 further comprises a camera 355.

Figure 7:
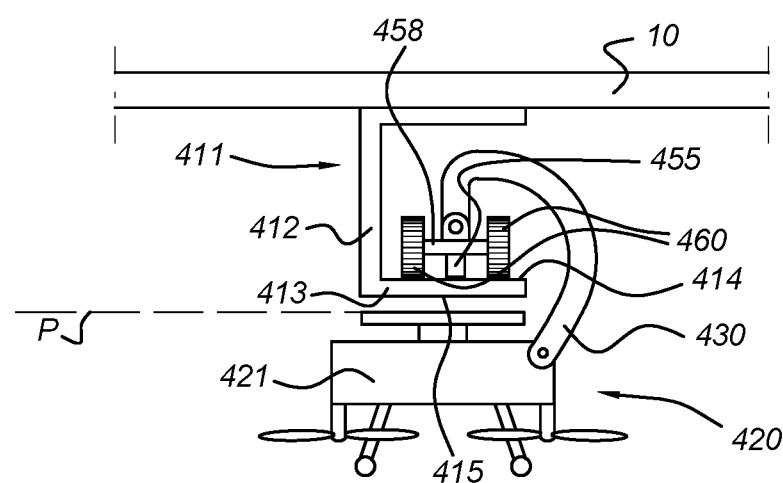
FIG. 7 schematically shows a UAV suitable for use with the method according to the invention.

FIG. 7 shows a side view of a UAV according to another embodiment of the invention. The UAV 420 is shown hanging from beam 411 having a C-shaped cross-section. The beam 411 is attached to a lower side of a roof 10 and includes an upright portion 412 and a horizontal strip 413 at a lower side of the beam, wherein the strip has a first surface 414 facing in the direction of the roof 10, and an oppositely facing second surface 415. The UAV 420 comprises a single, substantially sickle-shaped arm 430 which is pivotably connected to the body 421. The arm 430 comprises a propulsion mechanism 458 including a pair of rotatable wheels 460 for driving rolling movement of the wheels across the first surface 414. The UAV 420 further comprises an inspection device 455.

Figure 8:
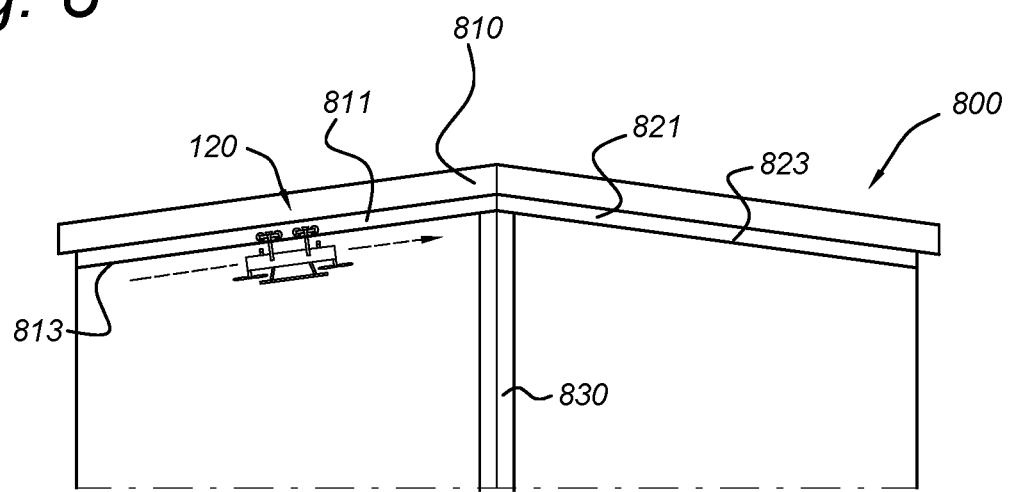
FIG. 8 schematically shows a structure comprising beams, with a UAV according the invention hanging from one of the beams.

FIG. 8 schematically shows a cross-sectional view of an oil tank 800 with roof 810 that is supported on two substantially straight beams 811, 821 and a substantially vertically extending support column 830. The beams are connected at an angle to the support column 830 and each have a longitudinal axis at a tilt to the horizontal. Each of the beams has a strip 813, 823 that extends in a plane substantially normal to a respective vertically extending upright portion of the beam, and has a first surface facing towards the roof, and an oppositely facing second surface, as described above. A UAV 120 according to the invention hangs from beam 811 with its arms in the second position and with its rotors switched off. The UAV 120 is shown moving along the beam 811 in a direction indicated by the dashed arrow. Once the UAV reaches the support column 830, its rotors can be switched on, and subsequently the arms can be moved from the second position to the first position, and the UAV can then be flown to the other beam 821.

Figure 9:
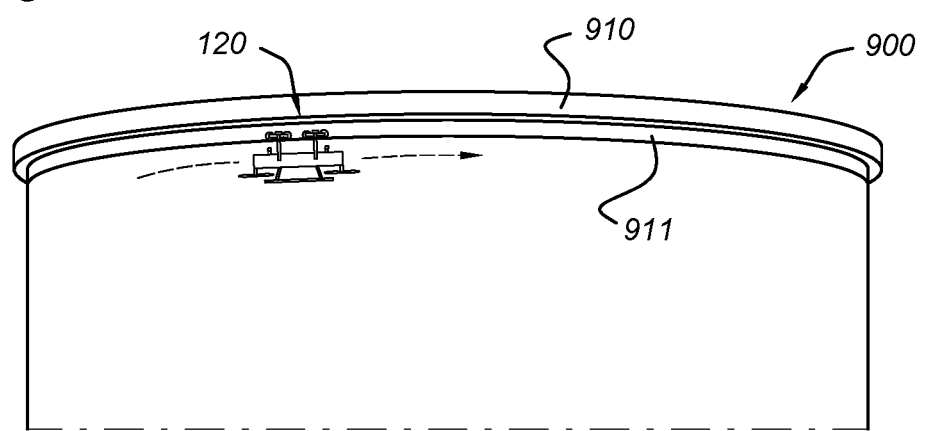
FIG. 9 schematically shows another structure with a beam and a UAV according to the invention hanging therefrom.

FIG. 9 schematically shows a cross-sectional view of a warehouse 900 with curved roof 910 and a curved beam. The UAV 120 can propagate along substantially the entire length beam as indicated by the dashed arrow.

Figure 10A:
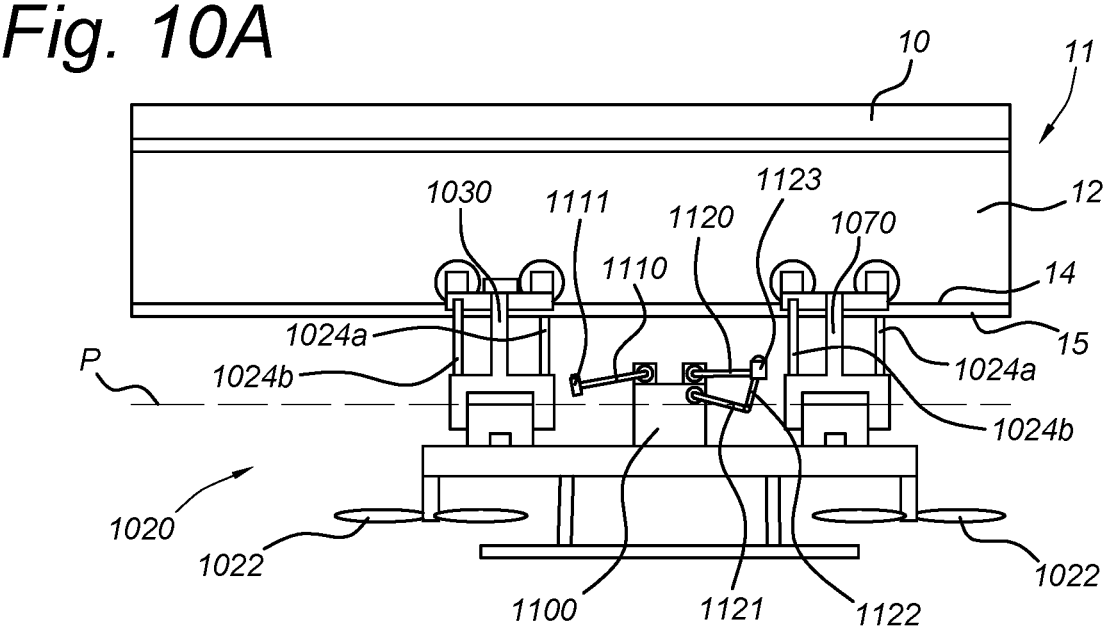
FIGS. 10A, 10B, 10C and 10D illustrate how a UAV according to the invention can be used to clean a surface of a beam and subsequently measure a property of the cleaned surface.
Figure 10B:
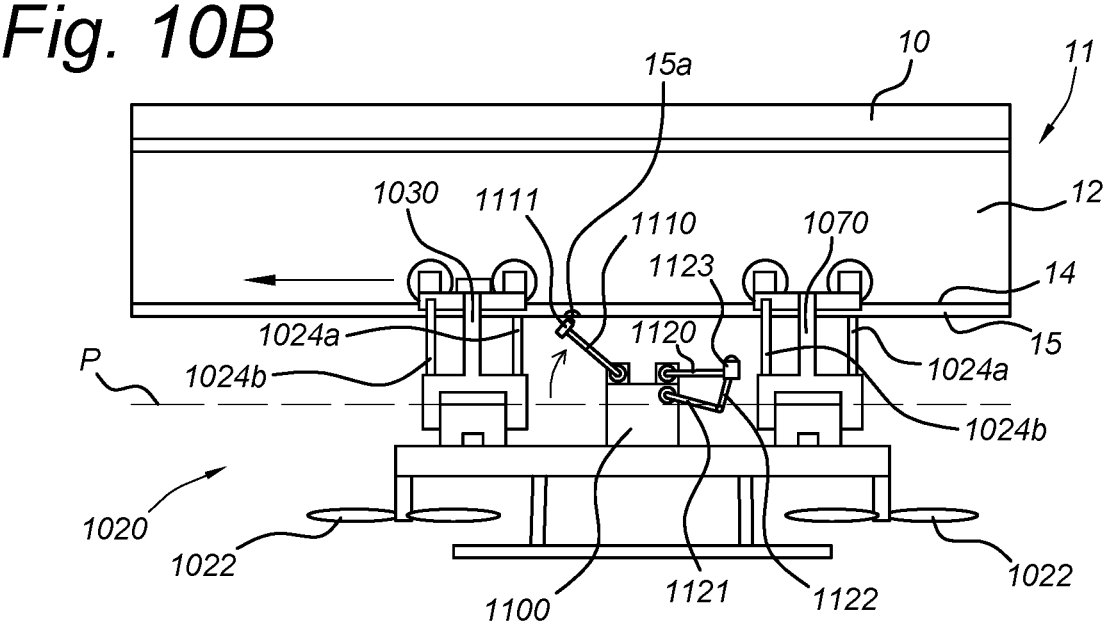
Figure 10C:
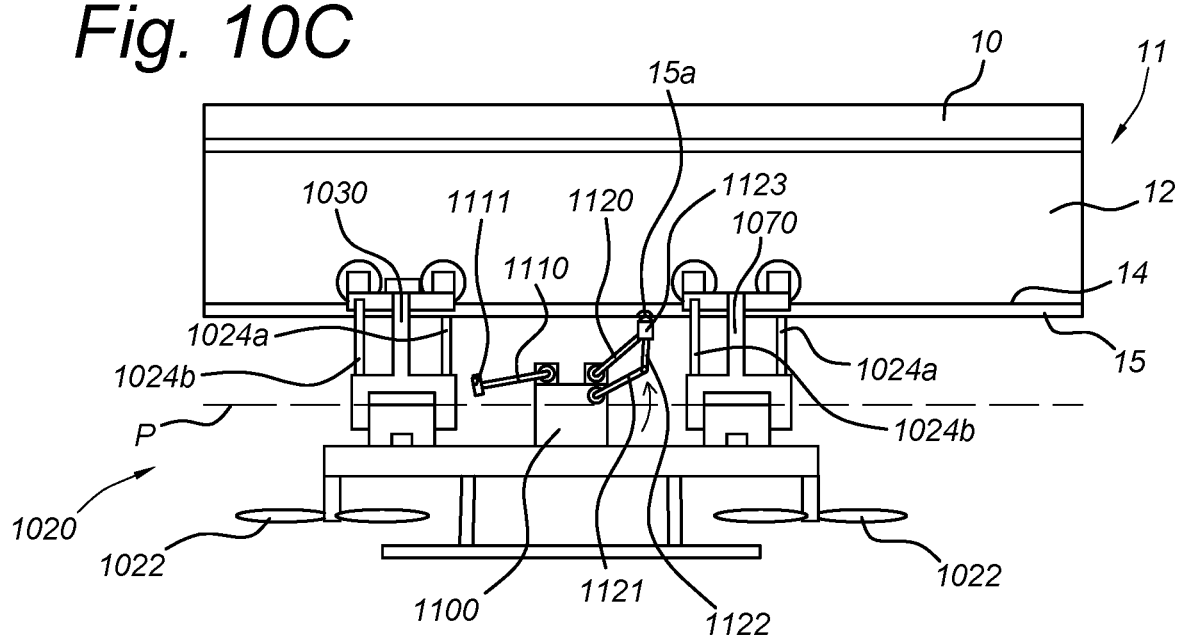
Figure 10D:
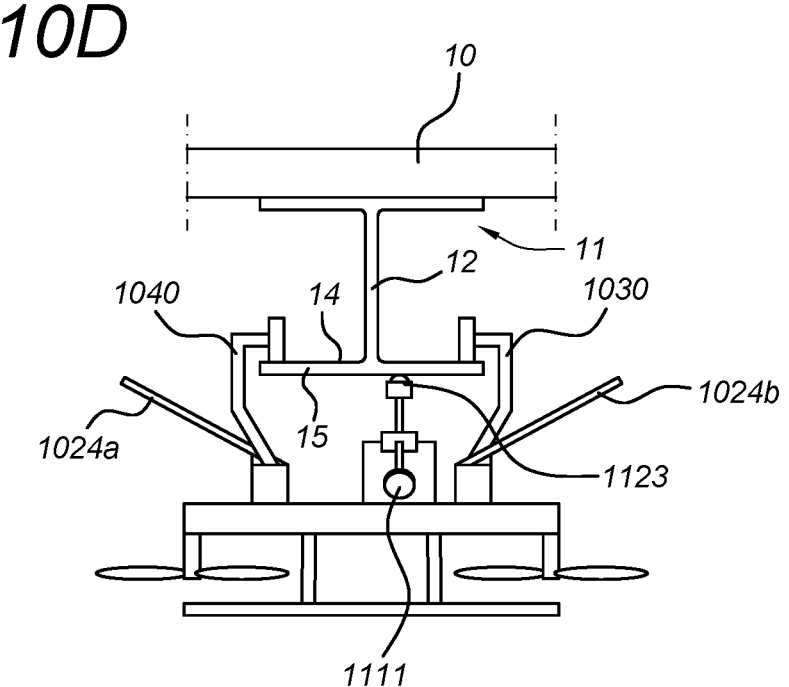

FIGS. 10A, 10B and 10C illustrate how a UAV 1020 according to the invention can be used to clean a surface of a beam 11 and subsequently measure a property of the cleaned surface, and FIG. 10D shows a schematical front view of the UAV 1020 of FIG. 10C.

In the side view of FIG. 10A the UAV 1020 hanging by its arms from a beam 11 which is arranged at an underside of a roof 10. Though only two of these arms are shown in FIGS. 10A-10C, it will be appreciated that the UAV has a two further arms at other side of the UAV body, similar to the UAV shown in FIGS. 3. and 4. Contact surfaces of the arms of the UAV 1020 rest on the first surface 14 of the beam. The UAV is provided with a manipulation tool in the form of a cleaning brush 1111 at the end of rotatable arm 1110. The UAV further comprises an inspection tool in the form of an ultrasonic gauge sensor 1123 at the end of a link mechanism comprising arms 1120, 1121 and 1122. In FIG. 10A, both the cleaning brush 1111 and the sensor 1123 are spaced apart from the beam 11. In FIG. 10B arm 1110 is actuated to rotate such that the cleaning brush 1111 contacts the second surface 15 of the beam which faces the brush. Next, the brush is driven to rotate while in contact with the second surface, preferably during which the wheels of the UAV which rest on the first surface are driven to move the UAV along the longitudinal direction of the beam. Operation of the cleaning brush results in at least a portion 15a of the second surface being cleaned by the brush.

Next, the arm 1110 is rotated away from the second surface 15 so that the brush 1111 no longer contacts the beam, and the wheels of the UAV are actuated to move the UAC further along the longitudinal direction of the beam until the UAV is at a position where the sensor 1113 can contact the cleaned portion 15a. Once the UAV is at that position, the link mechanism comprising the arms 1120, 1121 and 1122 is actuated to press the sensor 1123 against the cleaned surface portion 15a, in order to measure a beam property. As the surface is cleaned prior to measuring the beam property, an accurate measurement of a property of the beam, such as thickness, may be obtained.

FIG. 10D schematically shows a front view of the UAV of FIG. 10C, showing the two front side abutment elements 1023a, 1024b, near rotatable arms 1040 and 1030 at the front side of the UAV in greater detail. The two rotatable rear arms are provided with similar abutment elements, as shown in FIGS. 10A-10C. The abutment elements extend away from each other and from the rotors 1022 and from When the UAV's rotors 1022 are activated so that the UAV hovers in the air with both arms in the first position (not shown), the upper surfaces of the abutment elements act as guides for positioning the UAV with respect to the beam 11. When the top surfaces of the abutment elements 1023a, 1024b contact the second surface 15 of the beam, the arms are moved from their first positions to the second positions shown in FIG. 10D, allowing the UAV to hang from the beam with the abutment elements 1023a, 1024b spaced apart from the beam.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

The invention claimed is:

1. A method for inspecting and/or manipulating a beam at a lower side of a roof or deck, wherein the beam comprises a strip which has a first surface facing said lower side and spaced apart therefrom, and a second surface facing away from the first surface, the method comprising:
providing an unmanned aerial vehicle, UAV, the UAV comprising:
a body, comprising an abutment element having a top surface adapted for abutting the second surface of the strip;
a number of rotors for exerting a propulsion force on the UAV in an upward direction, wherein the rotors are supported by the body and arranged below the top surface;
a first arm, pivotably connected to the body, the first arm having an end portion for contacting the first surface, wherein the first arm is movable relative to the body between a first position in which, when seen in projection onto a plane parallel to the top surface, the end portion is spaced apart from the top surface, and a second position in which the end portion of the arm is arranged above the top surface; and
an inspection and/or manipulation tool;
the method further comprising the steps of:
while the first arm is in the first position, controlling the rotors to exert a propulsion force on the UAV for flying the UAV towards the beam such that the top surface approaches the second surface of the strip;
when the top surface of the abutment element contacts the second surface of the strip, moving the first arm from the first position to the second position such that the end portion of the first arm is moved to a position vertically above the first surface of the strip, and configured such that the first surface is arranged between the body and the end portion of the first arm;
controlling the rotors to reduce the upwardly directed propulsion force until the UAV hangs from the beam with the end portion of the arm in contact with and supported by the first surface of the strip; and
inspecting and/or manipulating the beam, using the inspection and/or manipulation tool, while the UAV hangs from the beam.

2. The method according to claim 1, wherein, when the UAV hangs from the beam, the top surface is spaced apart from the second surface.

3. The method according to claim 1, wherein the UAV further comprises:
a second arm, pivotably connected to the body, the second arm having an end portion for contacting the first surface, wherein the second arm is movable relative to the body between a first position in which, when seen in projection onto a plane parallel to the top surface, the end portion is spaced apart from the top surface, and a second position in which the end portion of the second arm is arranged above the top surface;

the method further comprising, when the top surface of the abutment element contacts the second surface of the strip:

moving the second arm from the first position to the second position such that the end portion of the second arm is moved to a position vertically above the first surface of the strip, and preferably such that the first surface is arranged between the body and the end portion of the second arm, and wherein, when the rotors are controlled to reduce the upwardly directed propulsion force until the UAV is in a hanging position, wherein the UAV is supported on the beam by the end portions of the first and second arms which contact the first surface of the strip.

4. The method according to claim 1, further comprising, when the UAV hangs from the beam, moving the UAV along the beam using a propulsion mechanism of the UAV while the propulsion mechanism is in contact with the beam, preferably while the rotors are switched off.

5. The method according to claim 4, wherein the propulsion mechanism comprises one or more rotatable wheels, wherein said wheels:

are comprised in the end portions of the first arm and/or second arm; and/or are part of the top surface of the abutment element.

6. The method according to claim 1, wherein the UAV comprises a manipulation tool in the form of cleaning equipment for cleaning a portion of the beam, and comprises an inspection tool for inspection a portion of the beam, the method comprising, when the UAV is in a hanging position in which the UAV is supported on the beam:

operating the cleaning equipment to clean a portion of the beam;

positioning the inspection tool at the cleaned location of the beam and inspecting said cleaned location using the inspection tool.

7. An unmanned aerial vehicle, UAV, for inspecting and/or manipulating a beam at a lower side of a roof or deck, wherein the beam comprises a strip which has a first surface facing said lower side and spaced apart therefrom, and a second surface facing away from the first surface, the beam further comprising an upright portion which extends upwards from the first surface and wherein the first surface extends from either side of the upright portion, the UAV comprising: a body comprising an abutment element which has a top surface adapted for abutting the second surface of the strip; a number of rotors supported by the body, the rotors being arranged below the top surface and adapted for exerting a propulsion force on the UAV in an upward direction; a first arm, pivotably connected to the body, the first arm having an end portion for contacting the first surface, the first arm being movable relative to the body between a first position in which, when seen in projection onto a plane parallel to the top surface, the end portion is spaced apart from the top surface, and a second position in which the end portion of the first arm is arranged above the top surface; a second arm, pivotably connected to the body, the second arm having an end portion for contacting the first surface, the second arm being movable relative to the body between a first position in which, when seen in projection onto the plane parallel to the top surface, the end portion is spaced apart from the top surface, and a second position in which the end portion of the second arm is arranged above the top surface; and an inspection and/or manipulation tool for inspecting and/or manipulating the beam or a portion thereof; wherein the end portions of the first and second arm each comprise a contact surface adapted for contacting the first surface, each contact surface, when its corresponding arm is in the second position, facing towards the body of the UAV, wherein in their respective second position the first arm is capable of resting on a portion of the upper surface on one side of the upright portion of the beam, and the second arm is capable of resting on a portion of the upper surface on an opposite side of the upright portion of the beam.

8. The UAV according to claim 7, wherein the contact surfaces are configured to be arranged spaced apart from each other on either side of the upright portion of the beam when the arms are in the second position.

9. The UAV according to claim 7, wherein the first and second arm are arranged such that, when they are moved from the first position to the second position, a lateral distance between the contact surfaces of the first and second are decreases continuously during said movement.

10. The UAV according to claim 7, wherein, when the arms are in their first positions, all parts of the UAV are completely arranged at a side of the top surface which faces towards the body.

11. The UAV according to claim 7, wherein the UAV is adapted for approaching the beam with the arms in their first positions, and for hanging from the beam in a hanging position with the arms in their second positions, in which the UAV is supported by the end portions of the arms, with said end portions contacting the first surface of the strip.

12. The UAV according to claim 7, wherein the inspection and/or manipulation tool comprises one or more sensors adapted for measuring a thickness of the beam, preferably wherein said one or more sensors are arranged on the first arm and/or second arm, more preferably wherein the one or more sensors are adapted for determining a thickness of a portion of the beam that extends substantially normal to the first surface of the strip.

13. The UAV according to claim 7, wherein the inspection and/or manipulation tool comprises cleaning equipment for cleaning a portion of the beam, preferably wherein the cleaning equipment comprises a steel brush.

14. The UAV according to claim 7, wherein the UAV further comprises a propulsion mechanism, adapted for moving the UAV along the beam while making contact with the beam.

15. The UAV according to claim 7, wherein the first arm and/or the second arm is further provided with an alignment device adapted for contacting a portion of the beam between the strip and the lower side of the deck or roof when the arms are in the second positions.

16. The UAV according to claim 7, wherein the first arm and the second arm are arranged opposite from each other, such that when the arms are moved from the first to the second positions, the end portions of the arms approach each other.

17. The UAV according to claim 7, wherein a location of pivotable connections between the body and the first arm and/or second arm is mechanically adjustable, preferably in such a manner that a distance between the pivotable connections of the first and second arms is adjustable.

18. The UAV according to claim 7, further comprising a third arm and a fourth arm.

19. The UAV according to claim 7, wherein the inspection and/or manipulation tool is arranged on an end portion of one of the arms, or on a separate, non-supporting arm.

20. The UAV according to claim 7, wherein the first and second arm are each provided with one or more wheels at their respective end portions, wherein the first and second arm are configured such that one or more axes of rotation of the wheels of the first arm substantially intersect one or more wheels of the second arm when the arms are in the second position, and/or one or more axes of rotation of the wheels of the second arm substantially intersect one or more wheels of the first arm when the arms are in the second position.

\* \* \* \* \*